(12) United States Patent
Piazza

(10) Patent No.: US 11,719,396 B2
(45) Date of Patent: Aug. 8, 2023

(54) DRIVEWAY EDGE ILLUMINATION SYSTEM

(71) Applicant: William Joseph Piazza, Raleigh, NC (US)

(72) Inventor: William Joseph Piazza, Raleigh, NC (US)

(*) Notice: Subject to any disclaimer, the term of this patent is extended or adjusted under 35 U.S.C. 154(b) by 60 days.

(21) Appl. No.: 17/321,421

(22) Filed: May 15, 2021

(65) Prior Publication Data
US 2021/0364138 A1 Nov. 25, 2021

Related U.S. Application Data

(60) Provisional application No. 63/028,452, filed on May 21, 2020.

(51) Int. Cl.
*F21S 4/26* (2016.01)
*F21V 23/04* (2006.01)
*F21V 31/00* (2006.01)
*H05B 47/16* (2020.01)
*F21V 15/01* (2006.01)
*F21Y 115/10* (2016.01)
*F21W 131/10* (2006.01)

(52) U.S. Cl.
CPC .............. *F21S 4/26* (2016.01); *F21V 15/01* (2013.01); *F21V 23/0464* (2013.01); *F21V 23/0471* (2013.01); *F21V 31/005* (2013.01); *H05B 47/16* (2020.01); *F21W 2131/10* (2013.01); *F21Y 2115/10* (2016.08)

(58) Field of Classification Search
CPC . F21S 4/26; H05B 47/16; F21V 15/01; F21V 23/0464; F21V 23/0471; F21V 31/005; F21Y 2115/10; F21W 2131/10
USPC ...................................... 362/217.1
See application file for complete search history.

(56) References Cited

U.S. PATENT DOCUMENTS

2019/0230324 A1* 7/2019 Chien ............... H04N 5/76

* cited by examiner

*Primary Examiner* — Andrew J Coughlin
*Assistant Examiner* — Hana S Featherly
(74) *Attorney, Agent, or Firm* — William Joseph Piazza

(57) ABSTRACT

The driveway edge illumination system may comprise one or more edge lights, one or more sensors, and at least one controller. The one or more edge lights may be positioned along one or more edges of a driveway and may be illuminated to mark the one or more edges of the driveway at night. The at least one controller may illuminate the one or more edge lights based upon one or more sensor signals received from the one or more sensors. The one or more sensors may inform the at least one controller of activity within one or more monitored zones via the one or more sensor signals. As non-limiting examples, the activity may be the presence or movement of a person or a vehicle within the one or more monitored zones. The at least one controller may be operable to extinguish the one or more edge lights.

20 Claims, 15 Drawing Sheets

DRIVEWAY EDGE ILLUMINATION SYSTEM

CROSS REFERENCES TO RELATED APPLICATIONS

This application claims the benefit of priority to U.S. Provisional Application No. 63/028,452, filed May 21, 2020, which is incorporated by reference herein in its entirety.

STATEMENT REGARDING FEDERALLY SPONSORED RESEARCH

Not Applicable

REFERENCE TO APPENDIX

Not Applicable

FIELD OF THE INVENTION

The present invention relates to the field of accident prevention systems, more specifically, a driveway edge illumination system.

BACKGROUND OF THE INVENTION

It may be unsettling to back out of a driveway that a person is not familiar with after dusk when the ambient lighting is poor. A driver may not be familiar with the width and course of a driveway. The available lighting, even with backup lights of a vehicle on, may be insufficient to clearly define the boundary between the driveway and a lawn. The driver may not be familiar with the positioning of objects that are just off of the driveway. As non-limiting examples, the driver may not realize that there is a risk of driving into a drainage ditch or striking a mail box, a telephone pole, fencing, a tree, a retaining wall, or other objects if the vehicle leaves the driveway by even a few inches. In addition, the lawn may be soft due to weather conditions and the vehicle may damage the lawn if it leaves the surface of the driveway. The situation may be exacerbated if the driveway is curved.

SUMMARY OF INVENTION

The driveway edge illumination system may comprise one or more edge lights, one or more sensors, and at least one controller. The one or more edge lights may be positioned along one or more edges of a driveway and may be illuminated to mark the one or more edges of the driveway at night. The at least one controller may illuminate the one or more edge lights based upon one or more sensor signals received from the one or more sensors. The one or more sensors may inform the at least one controller of activity within one or more monitored zones via the one or more sensor signals. As non-limiting examples, the activity may be the presence or movement of a person or a vehicle within the one or more monitored zones. The at least one controller may be operable to extinguish the one or more edge lights.

An object of the invention is to illuminate one or more edges of a driveway using one or more edge lights located adjacent to the driveway.

Another object of the invention is to illuminate the one or more edge lights based upon an activity.

A further object of the invention is to extinguish the one or more edge lights after a timed interval.

Yet another object of the invention is to mechanically support the one or more edge lights and to hold the one or more edge light in place using a plurality of stakes.

These together with additional objects, features and advantages of the driveway edge illumination system will be readily apparent to those of ordinary skill in the art upon reading the following detailed description of the presently preferred, but nonetheless illustrative, embodiments when taken in conjunction with the accompanying drawings.

In this respect, before explaining the current embodiments of the driveway edge illumination system in detail, it is to be understood that the driveway edge illumination system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the driveway edge illumination system.

It is therefore important that the claims be regarded as including such equivalent construction insofar as they do not depart from the spirit and scope of the driveway edge illumination system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
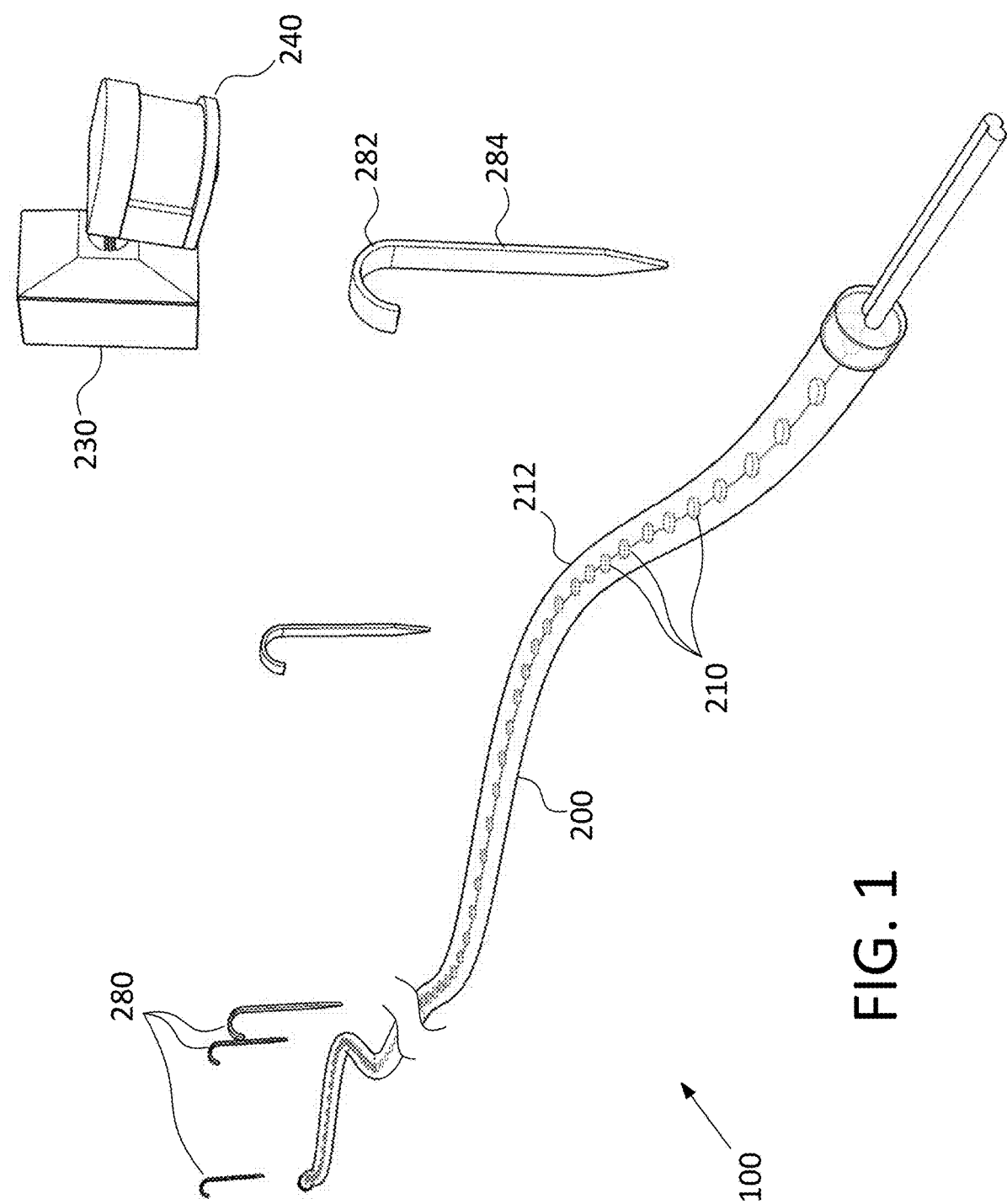
FIG. 1 is a detail view of an embodiment of the disclosure illustrating a controller, a sensor, an edge light, and a plurality of stakes.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 16.

The driveway edge illumination system 100 (hereinafter invention) may comprise one or more edge lights 200, one or more sensors 240, and at least one controller 230. The one or more edge lights 200 may be positioned along one or more edges 902 of a driveway 900 and may be illuminated to mark the one or more edges 902 of the driveway 900 at night. The at least one controller 230 may illuminate the one or more edge lights 200 based upon one or more sensor signals received from the one or more sensors 240. The one or more sensors 240 may inform the at least one controller 230 of activity within one or more monitored zones 290 via the one or more sensor signals. As non-limiting examples, the activity may be the presence or movement of a person or a vehicle within the one or more monitored zones 290. The at least one controller 230 may be operable to extinguish the one or more edge lights 200. The at least one controller 230 may illuminate and extinguish the one or more edge lights 200 by applying and removing an electrical potential to the one or more edge lights 200.

An individual edge light 202 selected from the one or more edge lights 200 may be placed along an edge 904 of the driveway 900 such that the individual edge light 202 is visible from within a vehicle when the individual edge light 202 is illuminated. As non-limiting examples, the individual edge light 202 may be adapted to be visible to a driver directly, via a rear view mirror, via a driver side mirror, via a passenger side mirror, or combinations thereof. The individual edge light 202 may be positioned such that the individual edge light 202 is adjacent to the driving surface of the driveway 900. The individual edge light 202 may be positioned such that the individual edge light 202 is not damaged if the vehicle leaves the driveway 900 and runs over the individual edge light 202. As a non-limiting example, the individual edge light 202 may be below grade level such that the top of the individual edge light 202 may be flush with the top surface of the driveway 900.

The individual edge light 202 may be an elongated, flexible, light tube. As non-limiting examples, the individual edge light 202 may be a rope light or a soft neon light. The individual edge light 202 may have any cross-sectional shape. In preferred embodiments, the individual edge light 202 may have a circular or rectangular cross-section.

The individual edge light 202 may comprise a plurality of lamps 210, a jacket 212, a core 222, one or more lamp interconnections 214, and a first power connection 216. The jacket 212 may be a covering that protects the one or more edge lights 200 from physical and environmental damage. The jacket 212 may be non-opaque such that light emitted by the plurality of lamps 210 is visible from outside of the jacket 212 when the plurality of lamps 210 are illuminated. Each end of the jacket 212 may be covered by an end cap 220 to seal the jacket 212 and to prevent water from entering the jacket 212. The individual edge light 202 may be waterproof such that ground moisture or water flowing over the individual edge light 202 does not disrupt the operation of the individual edge light 202.

The plurality of lamps 210 may be sources of illumination disposed along the core 222 within the jacket 212. The plurality of lamps 210 may be LEDs to optimize power consumption and life of the plurality of lamps 210. The plurality of lamps 210 may be electrically coupled to each other and to the first power connection 216 via the one or more lamp interconnections 214 such that the electrical potential applied at one end of the individual edge light 202 via the first power connection 216 may cause all of the plurality of lamps 210 to illuminate. The plurality of lamps 210 may be any color. In a preferred embodiment, the plurality of lamps 210 may glow red when illuminated such that the individual edge light 202 is adapted to preserve night vision.

In some embodiments, the individual edge light 202 may comprise a second power connection 218 at the end of the individual edge light 202 that is opposite the first power connection 216. The second power connection 218 may be electrically coupled to the one or more lamp interconnections 214. The length of the one or more edge lights 200 may be extended by coupling the second power connection 218 of a first edge light 204 to the first power connection 216 of a second edge light 206.

The one or more sensors 240 may be adapted to send the one or more sensor signals to the at least one controller 230 whenever the one or more sensors 240 detect motion, light, proximity of a person or vehicle, or combinations thereof which may be indicative of the activity in the one or more monitored zones 290 of the one or more sensors 240. As non-limiting examples, the one or more sensors 240 may use passive IR technology, reflected electromagnetic energy, reflected ultrasound, or combinations of the above to detect the activity.

The at least one controller 230 may determine when the one or more edge lights 200 are to be illuminated and when the one or more edge lights 200 are to be extinguished. The at least one controller 230 may comprise a timer 234. A determination to illuminate or to extinguish the one or more edge lights 200 may be based upon input received from the one or more sensors 240, a time interval determined by the timer 234, or combinations thereof. In a preferred embodiment, the at least one controller 230 may illuminate the one or more edge lights 200 when the one or more sensors 240 indicate that the activity may be within the one or more monitored zones 290 and may extinguish the one or more edge lights 200 after the time interval has elapsed. As a non-limiting example, a person walking to their vehicle may pass through the one or more monitored zones 290 causing the at least one controller 230 to illuminate the one or more edge lights 200. The at least one controller 230 may extinguish the one or more edge lights 200 10 minutes after they were illuminated, giving the person plenty of time to enter their vehicle and back out of the driveway 900 using the one or more edge lights 200 to guide them.

In some embodiments, the at least one controller 230 and the one or more sensors 240 may be packaged into a common enclosure. In some embodiments, the at least one controller 230, the one or more sensors 240, or both may be packaged with motion-sensing security lighting and may share functional elements with the motion-sensing security lighting. As a non-limiting example, an individual sensor 242 may be used to activate both the one or more edge lights 200 and the motion-sensing security lighting. In some embodiments, the individual sensor 242, an individual controller 232, or both may comprise one or more operator controls 238. The one or more operator controls 238 may establish operational parameters of the invention 100 such as the duration of illumination 224. As non-limiting examples, the one or more operator controls 238 may determine the sensitivity level of the individual sensor 242, the time duration that the one or more edge lights 200 stay on once energized, and a timeframe for operating the one or more edge lights 200, such as during the 6 hours after dusk.

The one or more sensors 240 and the one or more edge lights 200 may be electrically coupled via wiring 250. Specifically, the wiring 250 may comprise a power cable 252, a lighting cable 254, one or more sensor cables 256, or combinations thereof. The power cable 252 may be electrically coupled to a building electrical panel to supply power to the at least one controller 230. The lighting cable 254 may be electrically coupled to the first power connection 216 of the one or more edge lights 200. The one or more sensor cables 256 may couple the one or more sensors 240 to the at least one controller 230. The one or more sensor cables 256 may share sensor inputs between multiple controllers such that all of the controllers in an interconnected system may be aware of the activity sensed by any of the individual sensors 242. The activity in front of any one of the one or more sensors 240 may activate all of the one or more edge lights 200. The power cable 252, the lighting cable 254, and the one or more sensor cables 256 may exist as separate cables or may be distinct sets of wires within one or more common cables.

In some embodiments, the one or more edge lights 200 may be installed above one or more light supports 260 to improve the appearance of the one or more edge lights 200. Specifically, because the one or more edge lights 200 are flexible they may appear to be undulating where different portions of the one or more edge lights 200 are set deeper into the ground than adjacent portions of the one or more edge lights 200. The one or more light supports 260 may be semi-rigid footings that may be placed adjacent to the driveway 900 at a depth lower than the one or more edge lights 200 and the one or more edge lights 200 may be placed on top of the one or more light supports 260. Because the one or more light supports 260 are less flexible than the one or more edge lights 200, the one or more light supports 260 may prevent the undulations. Because the one or more light supports 260 are semi-rigid, they may flex if the vehicle drives over the one or more edge lights 200 to absorb the weight of the vehicle and may return to their original shape when the vehicle is no longer on the one or more edge lights 200.

A plurality of stakes 280 may retain the one or more edge lights 200 in place alongside the driveway 900. The plurality of stakes 280 may be driven into the ground adjacent to the one or more edge lights 200 such that heads 282 of the plurality of stakes 280 wrap over the top of the one or more edge lights 200 and shafts 284 of the plurality of stakes 280 are buried in the ground. The shape of the heads 282 of the plurality of stakes 280 may conform to the shape of the lights to minimize the profile of the plurality of stakes 280. The plurality of stakes 280 may be operable to hold the one or more edge lights 200 only or to hold the one or more edge lights 200 and the one or more light supports 260 together.

Turning now to FIG. 1, the figure illustrates an individual edge light 202, an individual sensor 242 and an individual controller 232 packaged together, and a plurality of stakes 280. In the embodiment shown, the individual edge light 202 has a circular cross-section.

Figure 2:
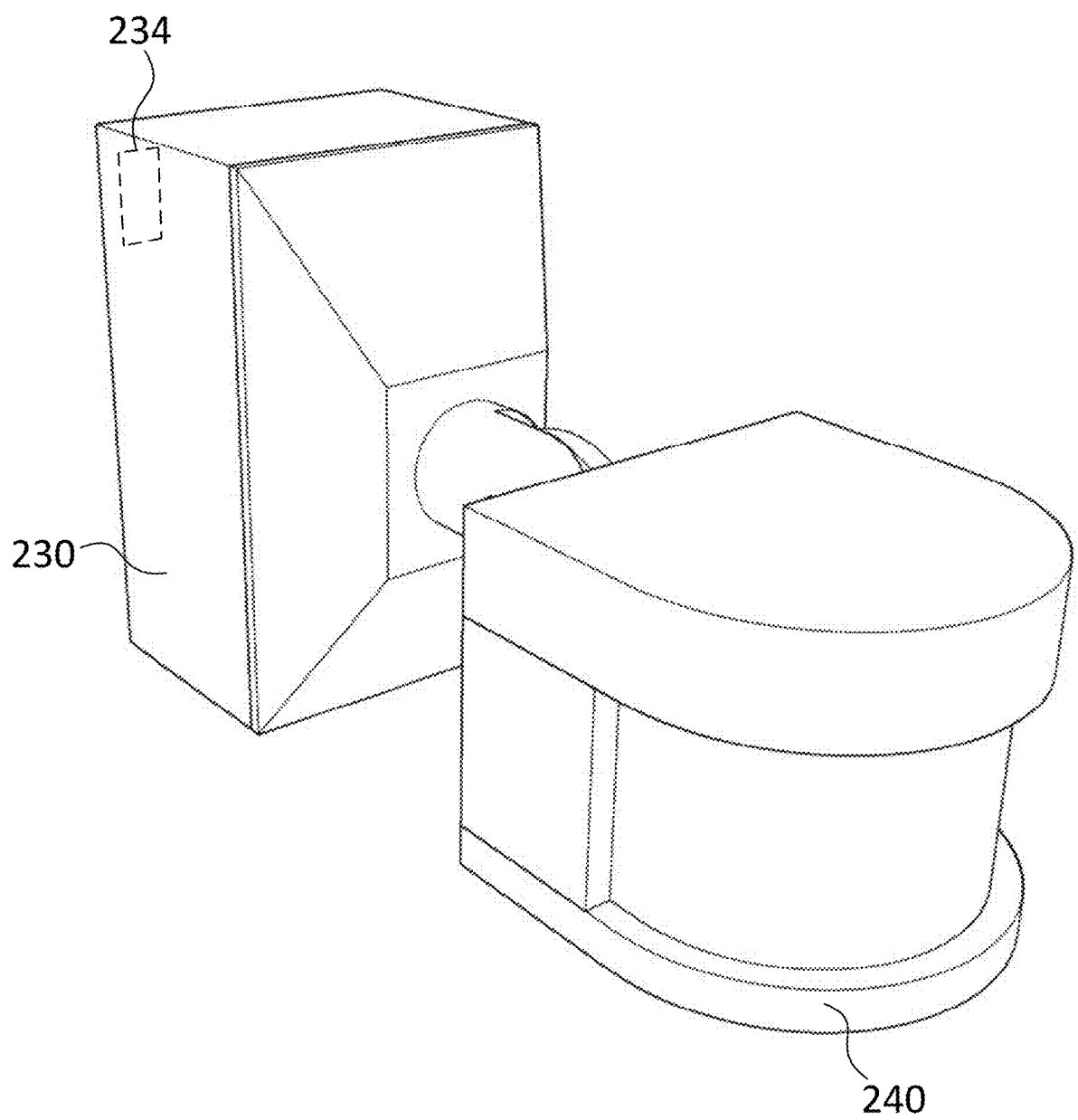
FIG. 2 is an isometric view of an embodiment of the disclosure illustrating a controller and a sensor.

Turning now to FIG. 2, the figure illustrates a perspective view of the individual sensor 242 and the individual controller 232 packaged together.

Figure 3:
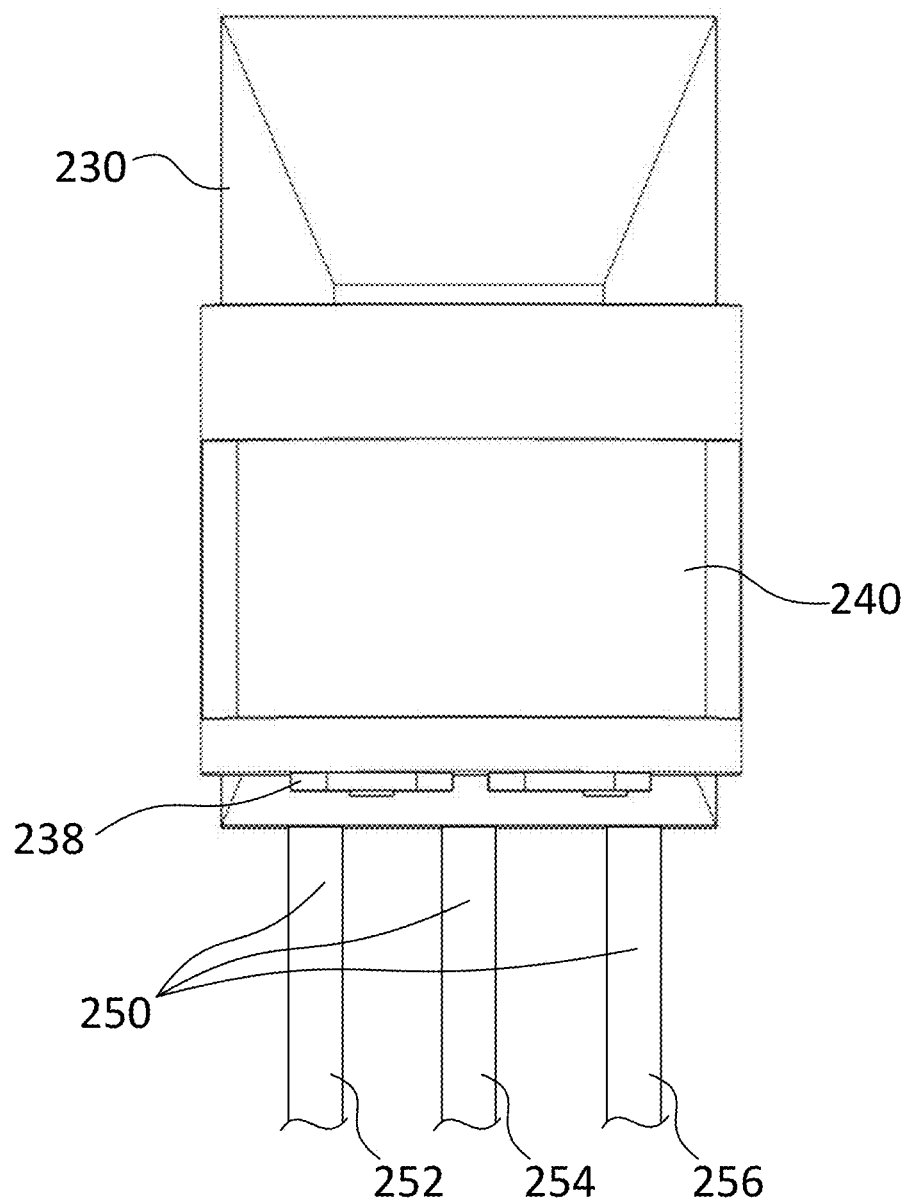
FIG. 3 is a front view of an embodiment of the disclosure illustrating a controller and a sensor with power, lighting, and sensor cables emerging from the controller.

Turning now to FIG. 3, the figure illustrates a front view of the individual sensor 242 and the individual controller 232 packaged together and shows wiring 250 coupled to the individual controller 232.

Figure 4:
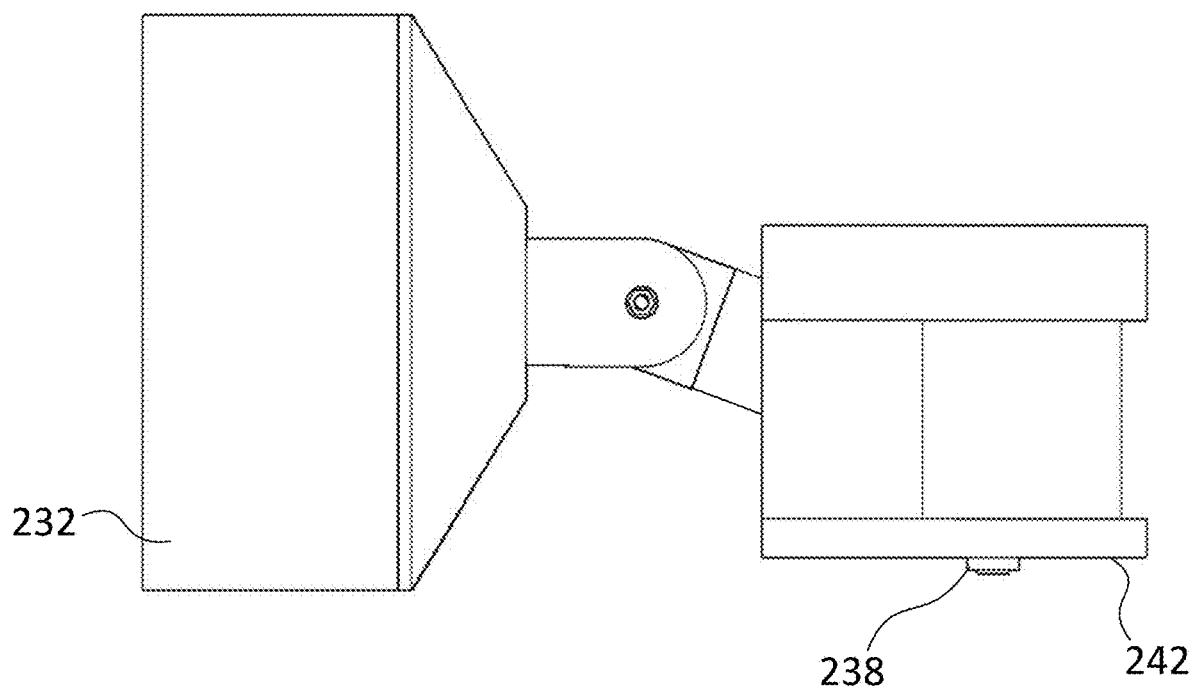
FIG. 4 is a side view of an embodiment of the disclosure illustrating a controller and a sensor.

Turning now to FIG. 4, the figure illustrates a side view of the individual sensor 242 and the individual controller 232 packaged together.

Figure 5:
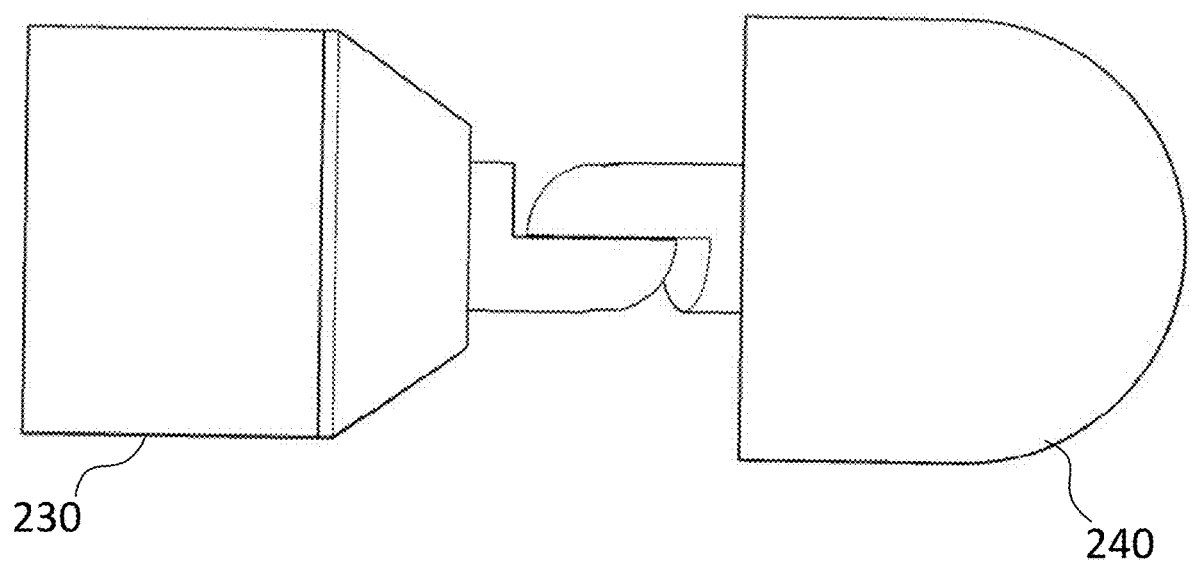
FIG. 5 is a top view of an embodiment of the disclosure illustrating a controller and a sensor.

Turning now to FIG. 5, the figure illustrates a top view of the individual sensor 242 and the individual controller 232 packaged together.

Figure 6:
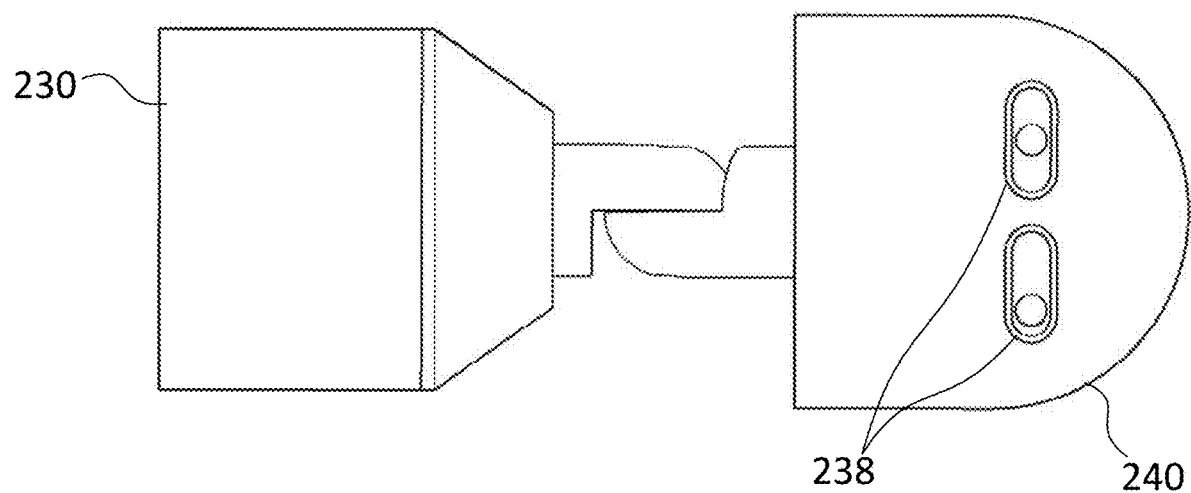
FIG. 6 is a bottom view of an embodiment of the disclosure illustrating a controller and a sensor.

Turning now to FIG. 6, the figure illustrates a bottom view of the individual sensor 242 and the individual controller 232 packaged together. The figure also shows one or more operator controls 238 located on the individual sensor 242.

Figure 7:
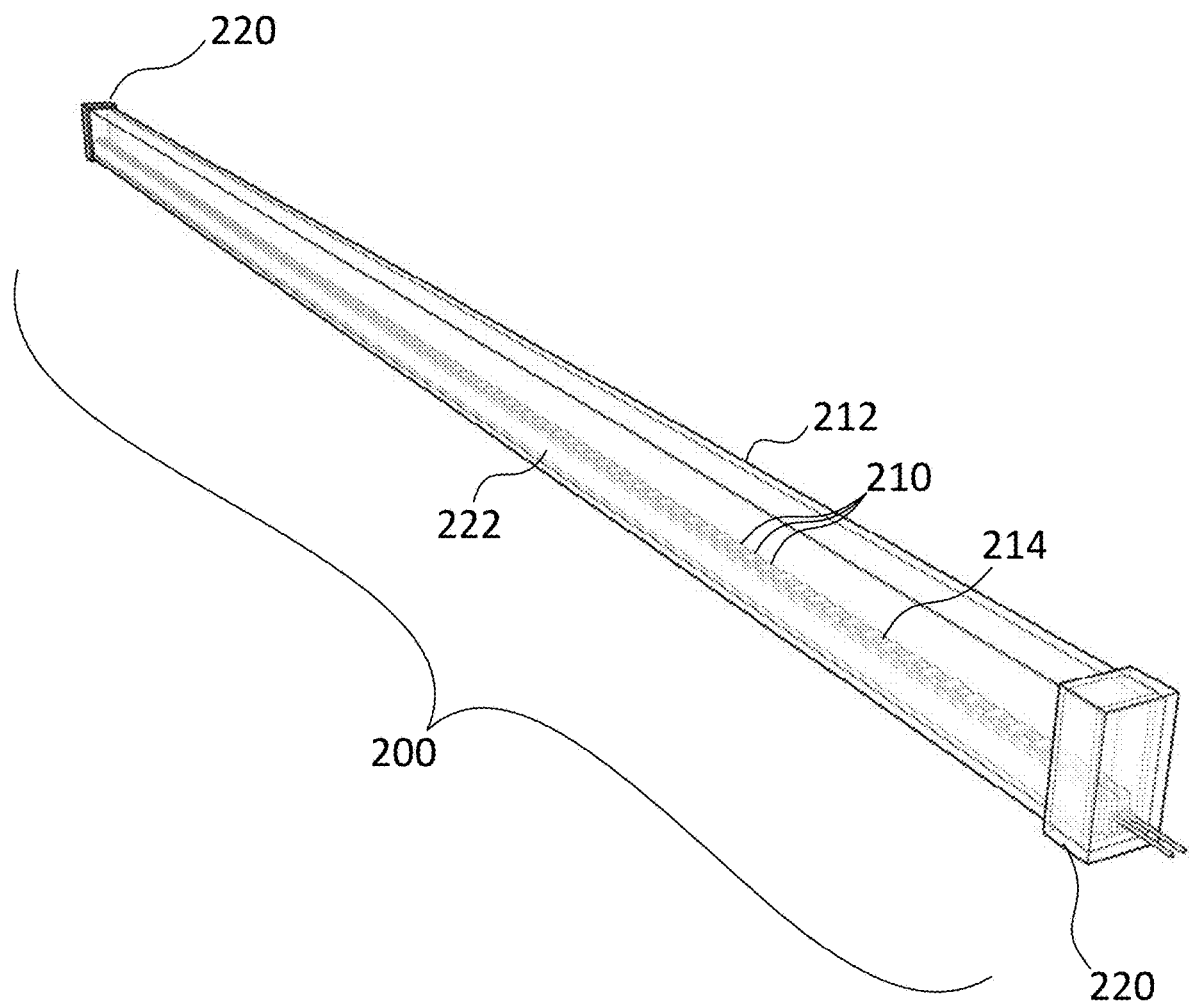
FIG. 7 is an isometric view of an embodiment of the disclosure illustrating an alternative embodiment of an edge light.

Turning now to FIG. 7, the figure illustrates an alternative form of the individual edge light 202 which has a rectangular cross-section.

Figure 8:
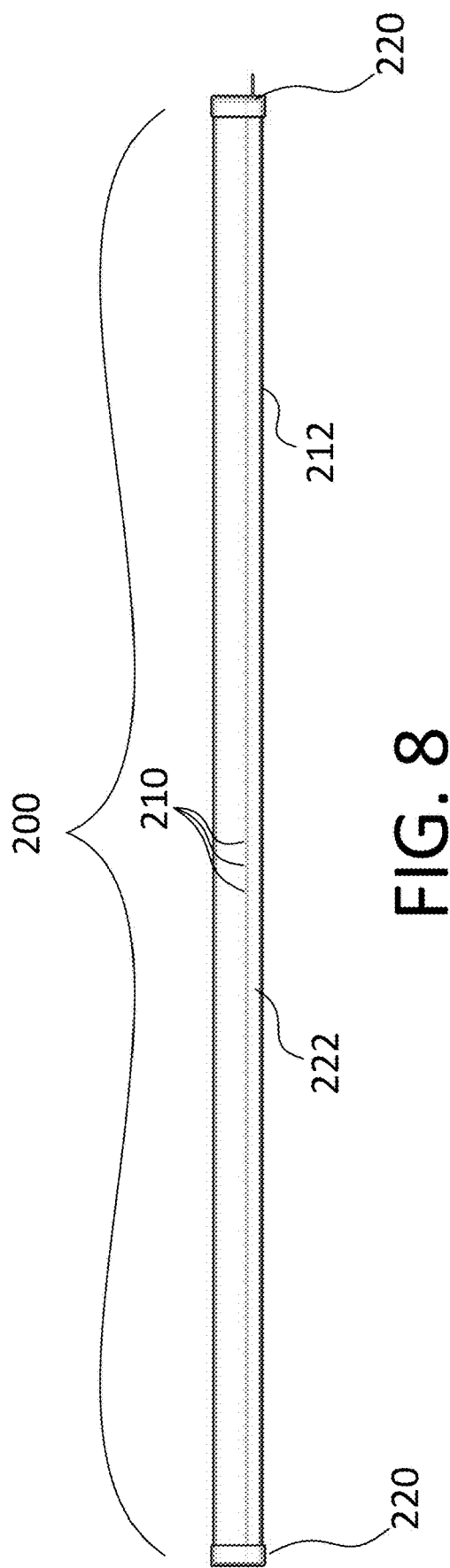
FIG. 8 is a side view of an embodiment of the disclosure illustrating an alternative embodiment of an edge light.

Turning now to FIG. 8, the figure illustrates a side view of the rectangular form of the individual edge light 202 shown in FIG. 7.

Figure 9:
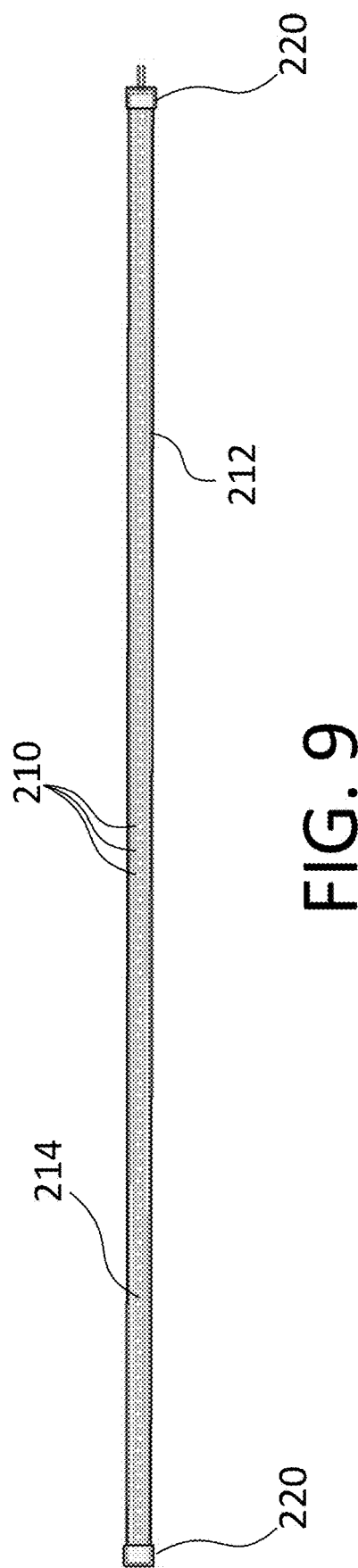
FIG. 9 is a top view of an embodiment of the disclosure illustrating an alternative embodiment of an edge light.

Turning now to FIG. 9, the figure illustrates a top view of the rectangular form of the individual edge light 202 shown in FIG. 7.

Figure 10:
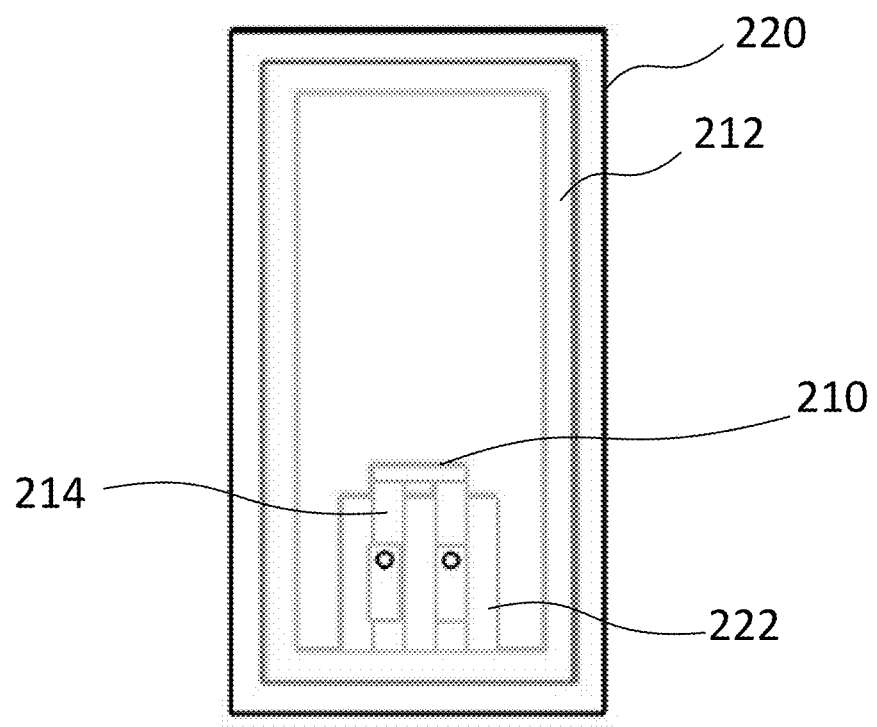
FIG. 10 is an end view of an embodiment of the disclosure illustrating an alternative embodiment of an edge light.

Turning now to FIG. 10, the figure illustrates a front view of the rectangular form of the individual edge light 202 shown in FIG. 7.

Figure 11:
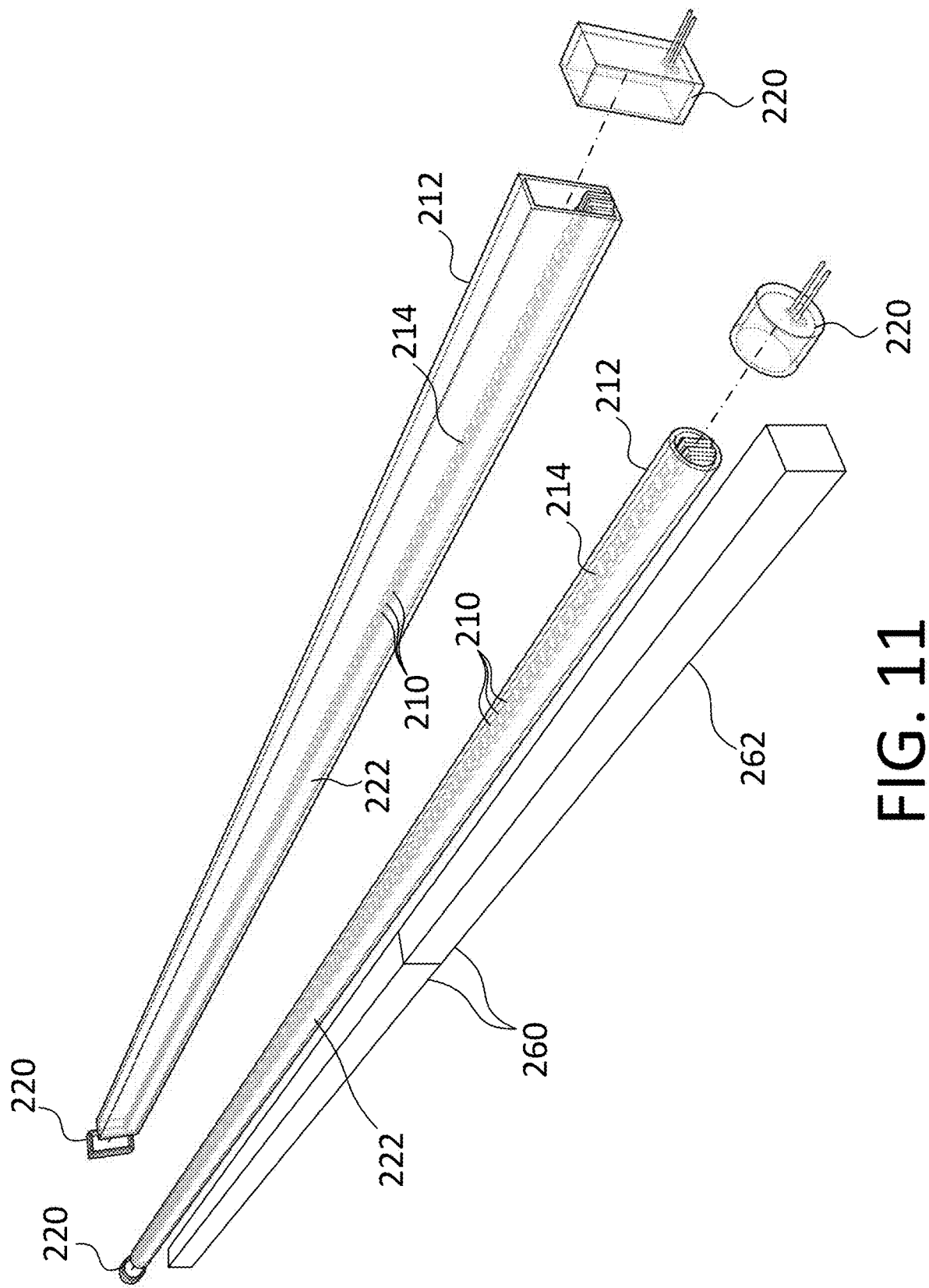
FIG. 11 is an exploded view of an embodiment of the disclosure illustrating circular and rectangular embodiments of the edge light and mechanical support for the edge light.

Turning now to FIG. 11, the figure shows an exploded view of the circular and rectangular forms of the individual edge lights 202. The figures also illustrates the positioning of an individual light support 262 under one of the individual edge lights 202.

Figure 12:
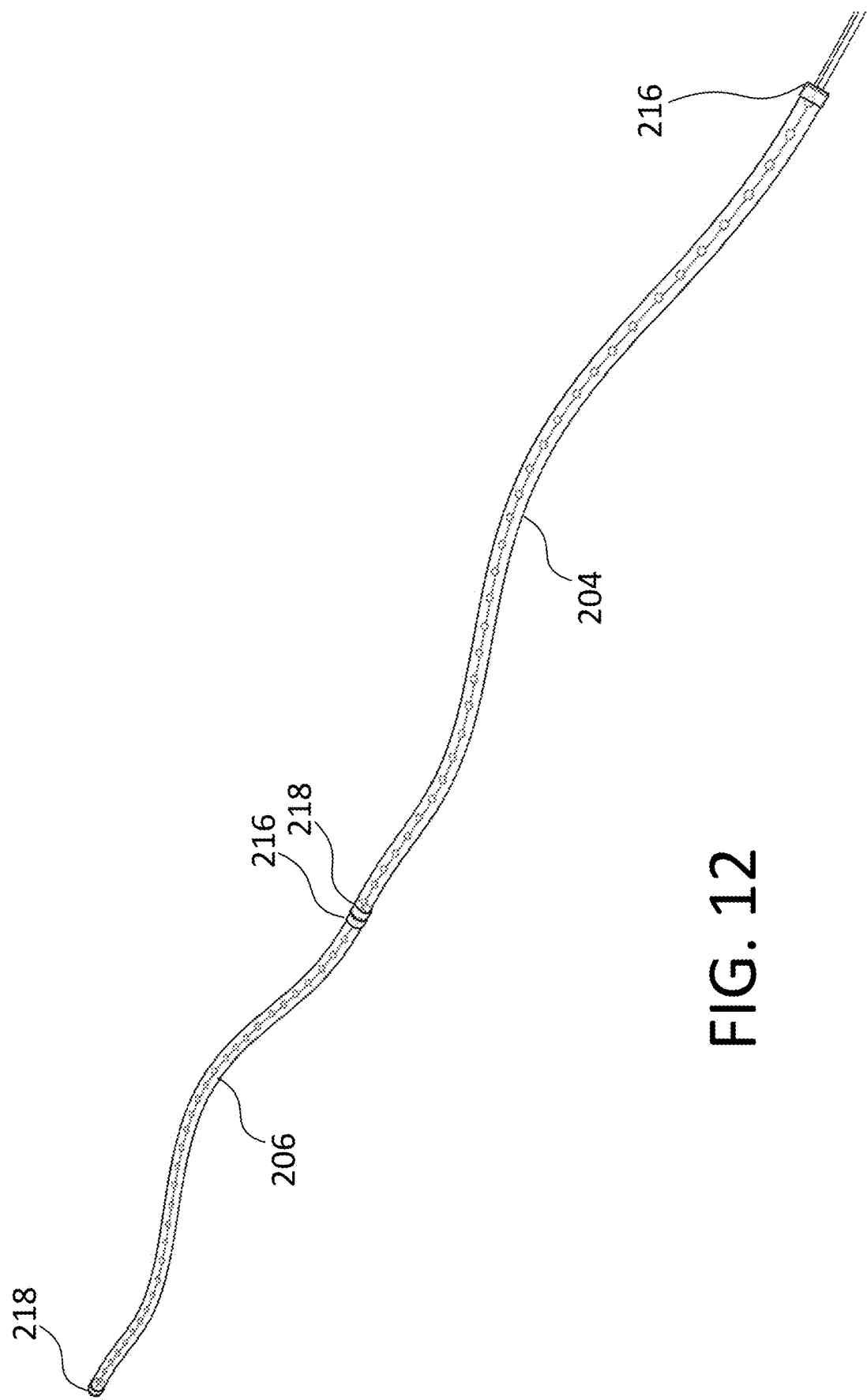
FIG. 12 is a detail view of an embodiment of the disclosure illustrating two edge lights coupled end-to-end to extend the overall length of the edge light.

Turning now to FIG. 12, illustrates extending the length of one or more edge lights 200 by coupling a first edge light 204 to a second edge light 206.

Figure 13:
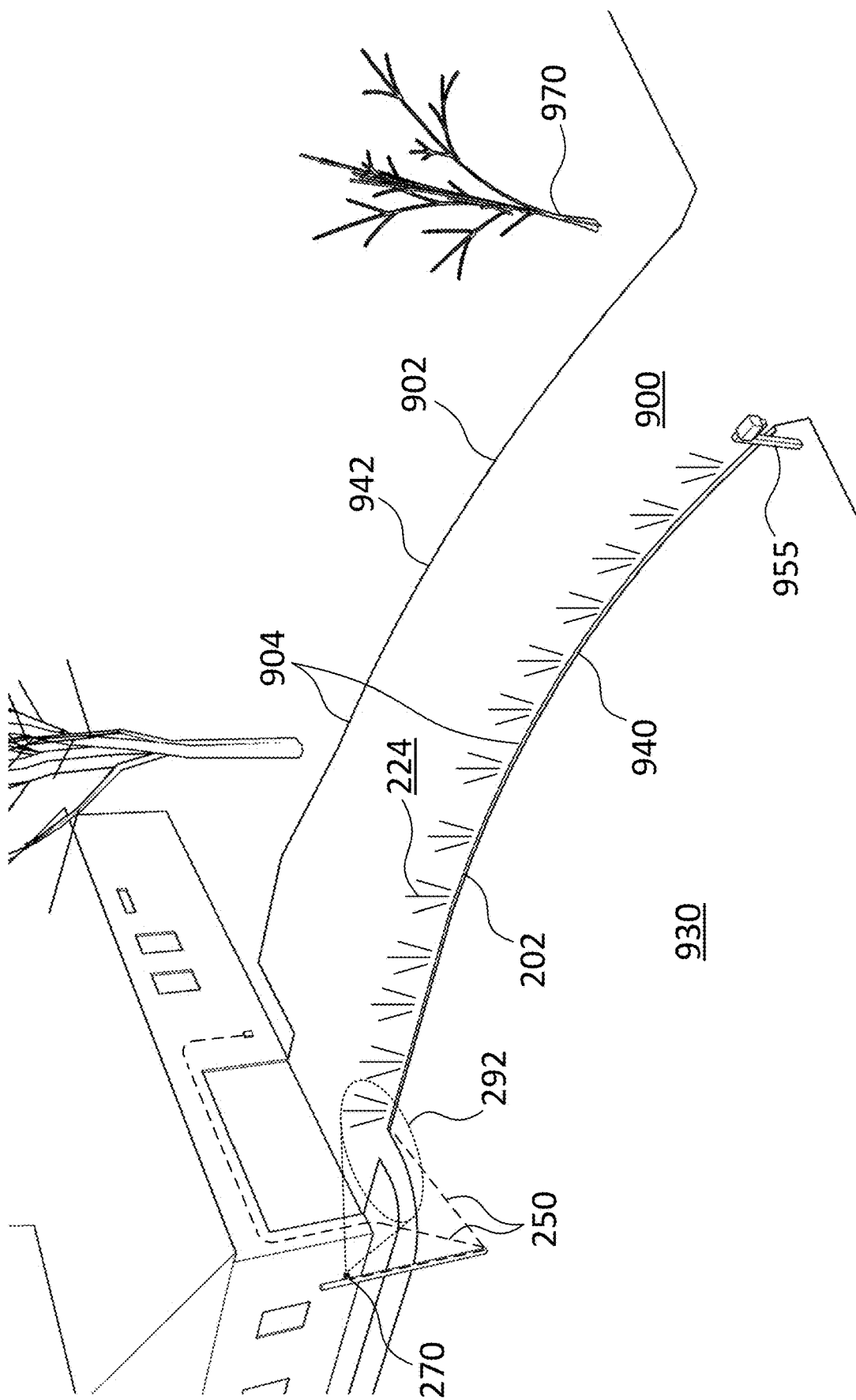
FIG. 13 is a detail view of an embodiment of the disclosure illustrating a driveway with one sensor and an edge light along one side of the driveway.

Turning now to FIG. 13, illustrates the one or more edge lights 200 along a first edge 940 of a driveway 900. At least one controller 230 may be packaged with a first sensor 270 and the at least one controller 230 may control the one or more edge lights 200. If a person or vehicle moves into an individual monitored zone 292 located in front of the first sensor 270, the one or more edge lights 200 may be energized as shown to mark one edge of the driveway 900.

While the one or more edge lights 200 are energized, illumination 224 from the one or more edge lights 200 may be visible.

Figure 14:
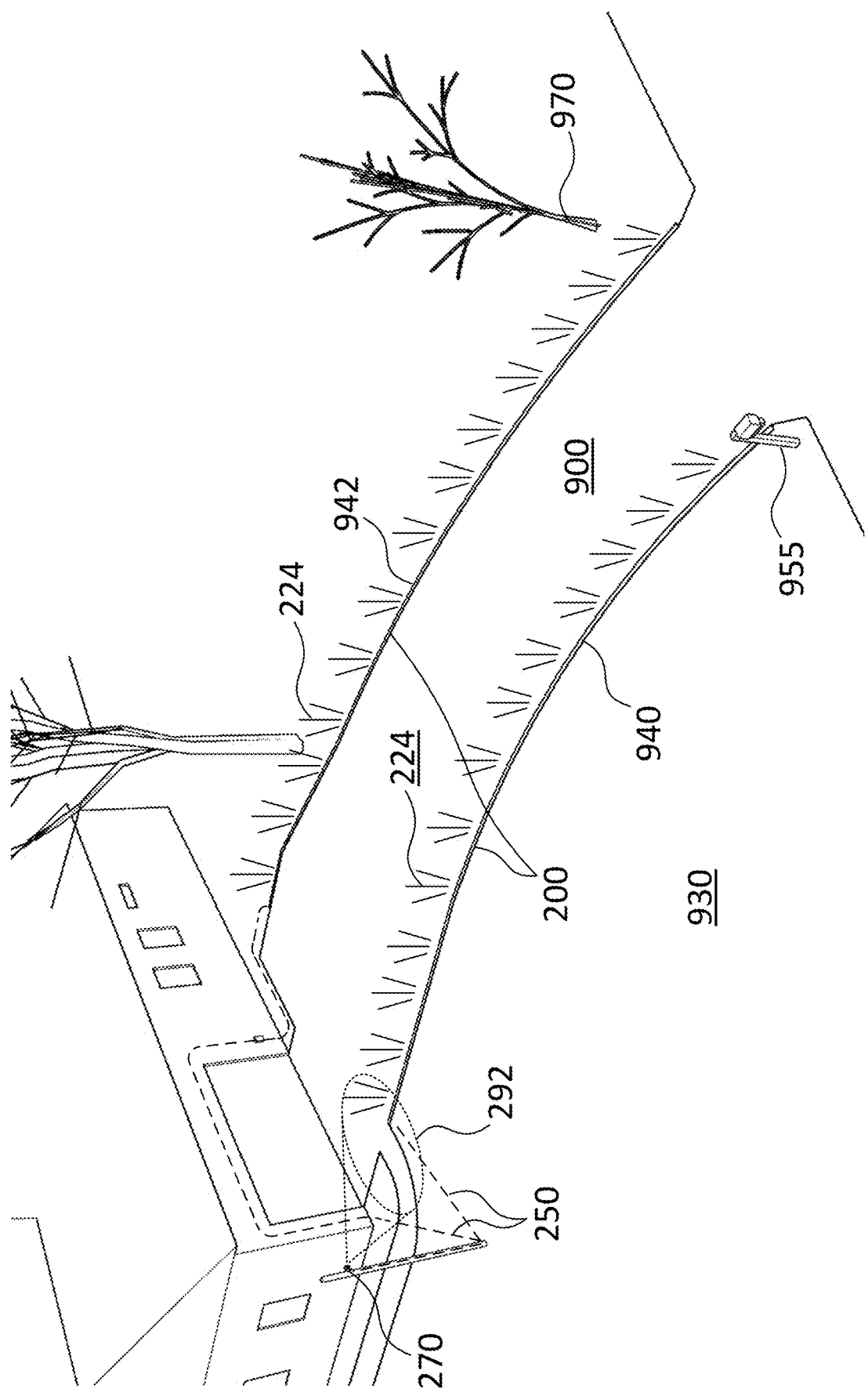
FIG. 14 is a detail view of an embodiment of the disclosure illustrating a driveway with one sensor and an edge light along two sides of the driveway.

Turning now to FIG. 14, illustrates one or more edge lights 200 along a first edge 940 and a second edge 942 of a driveway 900. If a person or vehicle moves into an individual monitored zone 292 located in front of a first sensor 270, the one or more edge lights 200 may be energized as shown to mark both edges of the driveway 900.

Figure 15:
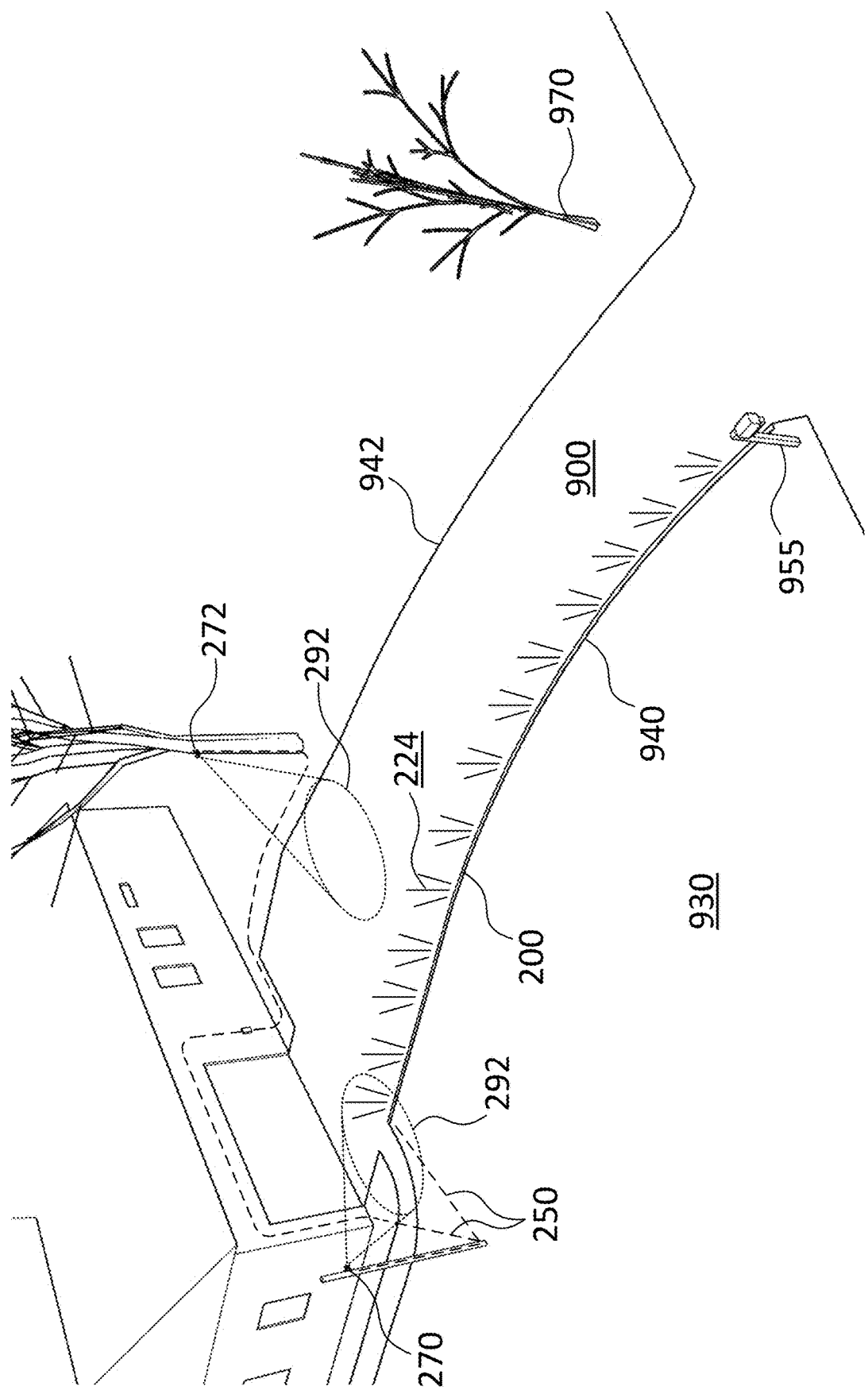
FIG. 15 is a detail view of an embodiment of the disclosure illustrating a driveway with two sensors and an edge light along one side of the driveway.

Turning now to FIG. 15, illustrates one or more edge lights 200 along a first edge 940 of a driveway 900. The one or more edge lights 200 are controlled by a first sensor 270 and a second sensor 272 working in conjunction with each other. If a person or vehicle moves into one or more monitored zones 290 located in front of the first sensor 270 or the second sensor 272, the one or more edge lights 200 may be energized as shown to mark one edge of the driveway 900. Wiring 250 may electrically connect one or more sensors 240, at least one controller 230, and the one or more edge lights 200.

Figure 16:
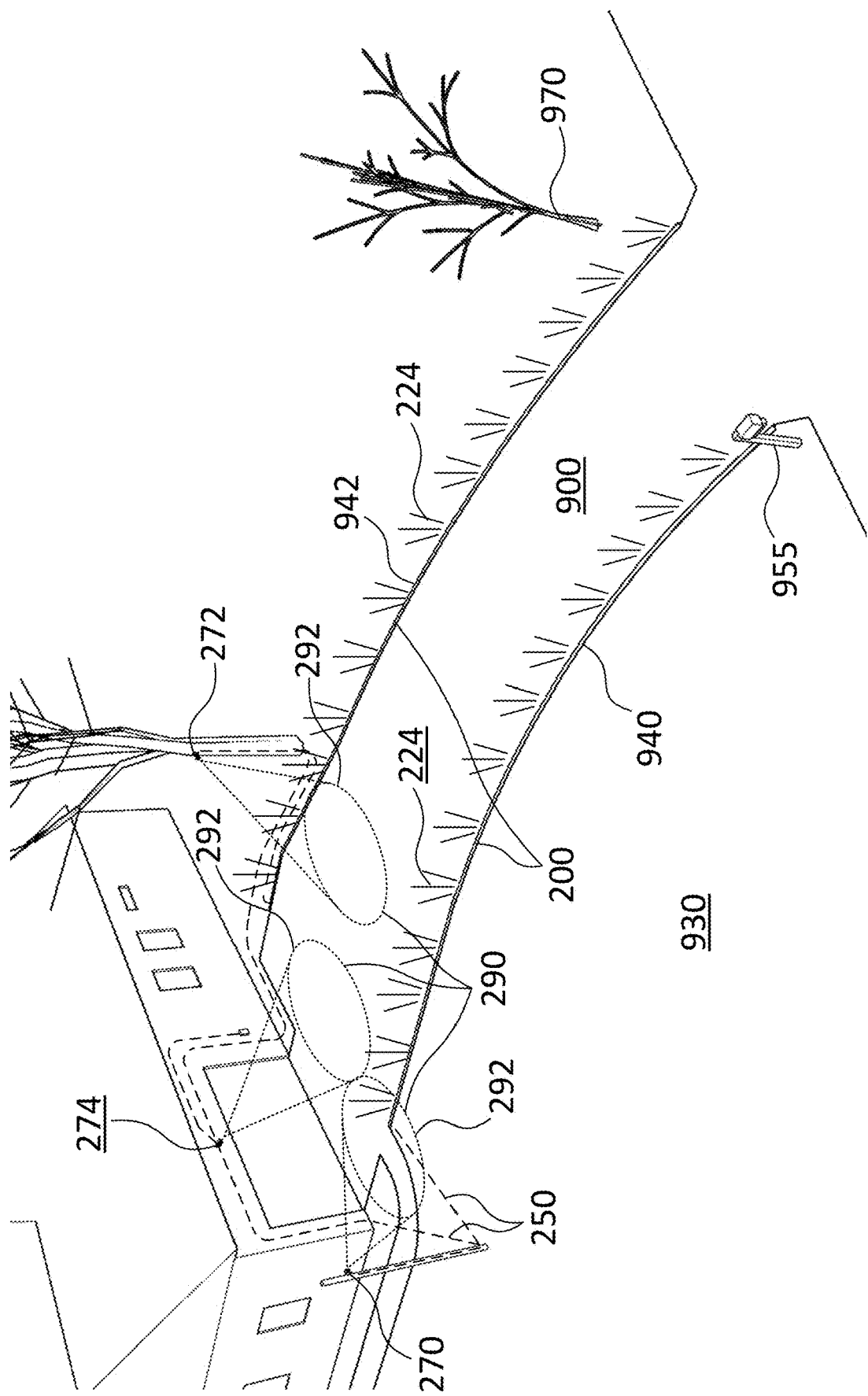
FIG. 16 is a detail view of an embodiment of the disclosure illustrating a driveway with three sensors and an edge light along two sides of the driveway.

Turning now to FIG. 16, illustrates one or more edge lights 200 along a first edge 940 and a second edge 942 of a driveway 900. The one or more edge lights 200 are controlled by a first sensor 270, a second sensor 272, and a third sensor 274 working in conjunction with each other. If a person or vehicle moves into one or more monitored zones 290 located in front of the first sensor 270, the second sensor 272, or the third sensor 274, the one or more edge lights 200 may be energized as shown to mark both edges of the driveway 900.

In use, one or more edge lights 200 are placed on one or both sides of a driveway 900 such that the one or more edge lights 200 are adjacent to the driveway 900 and below grade level. At least one controller 230 may be packages within one or more sensors 240 or may be mounted separately. Wiring 250 may interconnect the one or more sensors 240, the at least one controller 230, the one or more edge lights 200, and a power source. In some embodiments, the one or more edge lights 200 may be placed on top of one or more light supports 260 that assist in removing vertical undulations of the tops of the one or more edge lights 200. The one or more sensors 240 are mounted on the buildings, on poles, on trees, or at other elevated positions adjacent the driveway 900 such that activity of people and vehicles in the driveway 900 may be detected within one or more monitored zones 290 of the one or more sensors 240. Upon sensing a person or a vehicle in the driveway 900 using the one or more sensors 240, the at least one controller 230 may illuminate the one or more edge lights 200 to clarify the boundaries of the driveway 900. The at least one controller 230 may hold the one or more edge lights 200 energized for a predetermined on-time interval and may then extinguish the one or more edge lights 200. During the predetermined on-time interval, the one or more edge lights 200 may provide guidance for a vehicle to back down the driveway 900.

With respect to the above description, it is to be realized that the optimum dimensional relationship for the various components of the invention described above and in FIGS. 1 through 16, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A driveway edge illumination system comprising:
   one or more edge lights, one or more sensors, and at least one controller;
   wherein the one or more edge lights are positioned along one or more edges of a driveway and are illuminated to mark the one or more edges of the driveway;
   wherein the at least one controller illuminates the one or more edge lights based upon one or more sensor signals received from the one or more sensors;
   wherein the one or more sensors inform the at least one controller of activity within one or more monitored zones via the one or more sensor signals;
   wherein the at least one controller is operable to extinguish the one or more edge lights;
   wherein the at least one controller illuminates and extinguishes the one or more edge lights by applying and removing an electrical potential to the one or more edge lights;
   wherein the driveway edge illumination system is expandable to two or more edge lights;
   wherein the driveway edge illumination system is expandable to two or more sensors;
   wherein the number of sensors is independent of the number of edge lights;
   wherein the activity in front of any one of the one or more sensors activates all of the one or more edge lights;
   wherein the one or more edge lights and the one or more sensors are housed separately;
   wherein the one or more sensors are elevated to a height that places the one or more sensors above the one or more edge lights.

2. The driveway edge illumination system according to claim 1
   wherein an individual edge light selected from the one or more edge lights is placed along an edge of the driveway such that the individual edge light is visible from within a vehicle;
   wherein the individual edge light is positioned such that the individual edge light is adjacent to the driving surface of the driveway and in contact with the driveway;
   wherein the individual edge light is positioned such that wherein the individual edge light is positioned such that the individual edge light is free of damage from the vehicle leaving the driveway and running over the individual edge light.

3. The driveway edge illumination system according to claim 2
   wherein the individual edge light is below grade level such that the top of the individual edge light is flush with the top surface of the driveway.

4. The driveway edge illumination system according to claim 2
   wherein the individual edge light is an elongated, flexible, light tube.

5. The driveway edge illumination system according to claim 4
   wherein the individual edge light is a rope light or a soft neon light.

6. The driveway edge illumination system according to claim 4 wherein the individual edge light comprises a plurality of lamps, a jacket, a core, one or more lamp interconnections, and a first power connection;

wherein the jacket is a covering that protects the one or more edge lights from physical and environmental damage;

wherein the jacket is non-opaque such that light emitted by the plurality of lamps is visible from outside of the jacket.

7. The driveway edge illumination system according to claim 6 wherein each end of the jacket is covered by an end cap to seal the jacket and to prevent water from entering the jacket;

wherein the individual edge light is waterproof.

8. The driveway edge illumination system according to claim 7 wherein the plurality of lamps are sources of illumination disposed along the core within the jacket;

wherein the plurality of lamps are LEDs;

wherein the plurality of lamps are electrically coupled to each other and to the first power connection via the one or more lamp interconnections such that the electrical potential applied at one end of the individual edge light via the first power connection causes all of the plurality of lamps to illuminate.

9. The driveway edge illumination system according to claim 8 wherein the plurality of lamps glow red.

10. The driveway edge illumination system according to claim 8 wherein the individual edge light comprises a second power connection at the end of the individual edge light that is opposite the first power connection;

wherein the second power connection is electrically coupled to the one or more lamp interconnections;

wherein the length of the one or more edge lights are extended by coupling the second power connection of a first edge light to the first power connection of a second edge light.

11. The driveway edge illumination system according to claim 8 wherein the one or more sensors send the one or more sensor signals to the at least one controller responsive to detection of motion, light, proximity of a person or vehicle, or combinations thereof, indicative of the activity in the one or more monitored zones of the one or more sensors.

12. The driveway edge illumination system according to claim 11 wherein the one or more sensors use passive IR technology, reflected electromagnetic energy, reflected ultrasound, or combinations of the above to detect the activity.

13. The driveway edge illumination system according to claim 11 wherein the at least one controller controls the timing of illuminating and extinguishing the one or more edge lights;

wherein the at least one controller comprises a timer;

wherein a determination to illuminate or to extinguish the one or more edge lights is based upon input received from the one or more sensors, a time interval determined by the timer, or combinations thereof.

14. The driveway edge illumination system according to claim 13 wherein the at least one controller illuminates the one or more edge lights responsive to the one or more sensors indicating that the activity is within the one or more monitored zones and extinguishes the one or more edge lights after the time interval has elapsed.

15. The driveway edge illumination system according to claim 14 wherein the at least one controller and the one or more sensors are packaged into a common enclosure.

16. The driveway edge illumination system according to claim 14 wherein the at least one controller, the one or more sensors, or both are packaged with motion-sensing security lighting.

17. The driveway edge illumination system according to claim 14 wherein an individual sensor, an individual controller, or both comprise one or more operator controls;

wherein the one or more operator controls establish operational parameters of the driveway edge illumination system.

18. The driveway edge illumination system according to claim 17 wherein the one or more sensors and the one or more edge lights are electrically coupled via wiring;

wherein the wiring comprises a power cable, a lighting cable, one or more sensor cables, or combinations thereof;

wherein the power cable is electrically coupled to a building electrical panel to supply power to the at least one controller;

wherein the lighting cable is electrically coupled to the first power connection of the one or more edge lights;

wherein the one or more sensor cables couple the one or more sensors to the at least one controller.

19. The driveway edge illumination system according to claim 17 wherein the one or more edge lights are installed above one or more light supports to improve the appearance of the one or more edge lights;

wherein the one or more light supports are semi-rigid footings that are placed adjacent to the driveway at a depth lower than the one or more edge lights and the one or more edge lights are placed on top of the one or more light supports.

20. The driveway edge illumination system according to claim 17 wherein a plurality of stakes retain the one or more edge lights in place alongside the driveway;

wherein the plurality of stakes are driven into the ground adjacent to the one or more edge lights such that heads of the plurality of stakes wrap over the top of the one or more edge lights and shafts of the plurality of stakes are buried in the ground;

wherein the shape of the heads of the plurality of stakes conforms to the shape of the lights to minimize the profile of the plurality of stakes.

\* \* \* \* \*